(12) United States Patent
Kumai (10) Patent No.: US 8,593,593 B2
(45) Date of Patent: Nov. 26, 2013

(54) POLARIZATION ELEMENT, PROJECTOR, LIQUID CRYSTAL DEVICE, ELECTRONIC APPARATUS, AND METHOD OF MANUFACTURING POLARIZATION ELEMENT

(75) Inventor: Yoshitomo Kumai, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 173 days.

(21) Appl. No.: 13/282,909

(22) Filed: Oct. 27, 2011

(65) Prior Publication Data

US 2012/0105745 A1 May 3, 2012

(30) Foreign Application Priority Data

Nov. 1, 2010 (JP) .................................. 2010-245493

(51) Int. Cl.
*G02F 1/1335* (2006.01)
(52) U.S. Cl.
USPC .......................................................... 349/96
(58) Field of Classification Search
USPC .......................................................... 349/96
See application file for complete search history.

(56) References Cited

U.S. PATENT DOCUMENTS

| 6,785,050 | B2 | 8/2004 | Lines et al. |
| 7,233,563 | B2 * | 6/2007 | Ueki et al. ............... 369/112.03 |
| 7,570,424 | B2 | 8/2009 | Perkins et al. |
| 2008/0278811 | A1 | 11/2008 | Perkins et al. |
| 2008/0316599 | A1 | 12/2008 | Wang et al. |
| 2011/0310328 | A1 | 12/2011 | Kumai |
| 2011/0310329 | A1 | 12/2011 | Kumai |

FOREIGN PATENT DOCUMENTS

| JP | 10-073722 | 3/1998 |
| JP | 4411202 | 11/2009 |
| JP | 2010-530994 | 9/2010 |
| JP | 2010-530995 | 9/2010 |

* cited by examiner

*Primary Examiner* — Phu Vu
(74) *Attorney, Agent, or Firm* — Workman Nydegger (57) ABSTRACT

A polarization element according to the invention includes a substrate, a metal layer and an absorber layer formed on the substrate to form a stripe in a plan view and stacked in a thickness direction of the substrate, a first dielectric layer formed on a surface of the metal layer and a second dielectric layer formed on a surface of the absorber layer. The first dielectric layer is made of an oxide of a metal constituting the metal layer, and the second dielectric layer is made of an oxide of a material constituting the absorber layer.

17 Claims, 6 Drawing Sheets

POLARIZATION ELEMENT, PROJECTOR, LIQUID CRYSTAL DEVICE, ELECTRONIC APPARATUS, AND METHOD OF MANUFACTURING POLARIZATION ELEMENT

BACKGROUND

1. Technical Field

The present invention relates to a polarization element, a projector, a liquid crystal device, an electronic apparatus, and a method of manufacturing the polarization element.

2. Related Art

There is known a wire grid polarization element as a type of polarization element (e.g., Japanese Patent No. 4,411,202 (Document 1), JP-A-10-73722 (Document 2)). The wire grid polarization element is provided with a configuration in which a transparent substrate is lined with a grid made of metal at a pitch shorter than the wavelength of a light used therein. The wire grid polarization element can be composed only of inorganic substances, and therefore, has remarkably small deterioration caused by light irradiation compared with a polarization plate made of an organic substance, and attracts the attention as an effective device in the liquid crystal projector field increasing in brightness.

The wire grid polarization element is provided with an excellent heat resistant property, and is required to have further high-temperature reliability due to the increase in brightness of the liquid crystal projector in recent years.

In Document 1, aminophosphonate is formed on a surface of the wire grid polarization element, thereby achieving protection of the metal grid. However, since the aminophosphonate, which is an organic molecule, is decomposed in a purpose of being heated to 200° C. or higher, it is not achievable to assure sufficient reliability.

Incidentally, in Document 2, a surface of the metal grid (metal thin wire) on a substrate is oxidized by a heat treatment to thereby improve the environment resistance. However, since it is required to heat the substrate to 500° C. or higher for the oxidation process, breakage or deformation of the substrate is caused in some cases. Further, in some cases, the metal grid itself is damaged by the heat expansion, and thus the dimensions such as the height or the width of the metal grid determining the optical characteristics may change.

SUMMARY

An advantage of some aspects of the invention is to provide a polarization element superior in high-temperature reliability and a method of manufacturing the polarization element.

An aspect of the invention is directed to a polarization element including a substrate, a metal layer and an absorber layer formed on the substrate to form a stripe in a plan view and stacked in a thickness direction of the substrate, a first dielectric layer formed on a surface of the metal layer, and made of an oxide of a metal constituting the metal layer, and a second dielectric layer formed on a surface of the absorber layer, and made of an oxide of a material constituting the absorber layer.

According to this configuration, since the laminate structure including the metal layer and the absorber layer is provided, the absorptive polarization element can be realized. Further, since the metal layer and the absorber layer are respectively covered by the first dielectric layer as the oxide of the metal constituting the metal layer and the second dielectric layer made of the oxide of the material constituting the absorber layer, it becomes difficult for the oxide films on the surfaces of the metal layer and the absorber layer to grow even if the temperature of the polarization element rises during use. Therefore, the oxidation of the metal layer and the absorber layer can be prevented, and thus the variation in the polarization split characteristics can be prevented. Thus, the superior high-temperature reliability can be obtained.

The polarization element of the aspect of the invention may be configured such that a third dielectric layer is formed between the metal layer and the absorber layer.

According to this configuration, the mutual diffusion of the constituent elements between the metal layer and the absorber layer can be prevented, and thus, the variation in the polarization split characteristics caused by the diffusion described above can be prevented.

The polarization element of the aspect of the invention may be configured such that a fourth dielectric layer is formed as an upper layer of a laminate body. The laminate body includes the metal layer and the absorber layer.

According to this configuration, since the fourth dielectric layer separated from the other dielectric layers is formed in the uppermost layer of the laminate body, the fourth dielectric layer can be formed using an arbitrary dielectric material. Thus, since the fourth dielectric layer can be formed using a material having a light absorption property or a material having a light transmitting property, the configuration capable to improve the optical characteristics of the polarization element can be obtained.

The polarization element of the aspect of the invention may be configured such that the absorber layer is made of at least one material selected from the group consisting of silicon, germanium, and chromium.

According to this configuration, a reflective polarization element with a low reflectance can be realized.

The polarization element of the aspect of the invention may be configured such that the metal layer is made of at least one metal selected from the group consisting of aluminum, silver, copper, chromium, titanium, nickel, tungsten, and iron.

According to this configuration, the dielectric layer made of the oxide of the metal constituting the metal layer can easily be formed on the surface of the metal layer, and the polarization element capable of effectively preventing the oxidation of the metal layer due to the temperature rise during use can be obtained.

Another aspect of the invention is directed to a method of manufacturing a polarization element including: (a) forming a metal layer and an absorber layer on one surface of a substrate so as to form a stripe in a plan view, the metal layer and the absorber layer being stacked in a thickness direction of the substrate, and (b) forming a first dielectric layer on a surface of the metal layer and a second dielectric layer on a surface of the absorber layer by oxidizing the surface of the metal layer and the surface of the absorber layer in an atmosphere including oxygen.

According to this manufacturing process, at first, the metal layer and the absorber layer are formed in a stacked manner, and then the first and second dielectric layers are formed by performing the oxidation treatment on these layers in a lump. Consequently, the polarization element superior in the high-temperature reliability can easily be manufactured.

The method of the aspect of the invention may be configured such that the atmosphere including oxygen is an ozone gas atmosphere.

According to this manufacturing method, the dielectric layer made of a dense oxide film can promptly be formed, and the high-temperature reliability of the polarization element can be improved.

The method of the aspect of the invention may be configured such that the substrate is irradiated with an ultraviolet light in step (b).

According to this manufacturing method, it is possible to accelerate the decomposition reaction of ozone to thereby form the oxide film at low temperature. Further, it is also possible to enhance the denseness of the oxide film thus formed to thereby improve the high-temperature reliability of the polarization element.

Still another aspect of the invention is directed to a projector including an illumination optical system adapted to emit a light, a liquid crystal light valve adapted to modulate the light, and a projection optical system adapted to project the light modulated by the liquid crystal light valve on a projection target surface, wherein any one of the polarization elements described above is disposed at least one of between the liquid crystal light valve and the illumination optical system and between the liquid crystal light valve and the projection optical system.

According to this configuration, a projector equipped with the polarization element superior in the high-temperature reliability to thereby correspond to the high-power light source can be provided.

Yet another aspect of the invention is directed to a liquid crystal device including a liquid crystal layer held between a pair of substrates, and any one of the polarization elements described above formed on the liquid crystal layer side of at least one of the pair of substrates.

According to this configuration, the liquid crystal device equipped with the polarization element superior in the high-temperature reliability can be provided.

Still yet another aspect of the invention is directed to an electronic apparatus equipped with the liquid crystal device described above.

According to this configuration, the electronic apparatus equipped with a display section superior in the high-temperature reliability can be provided.

BRIEF DESCRIPTION OF THE DRAWINGS

The invention will be described with reference to the accompanying drawings, wherein like numbers reference like elements.

DESCRIPTION OF AN EXEMPLARY EMBODIMENT

Hereinafter, embodiments of the invention will be described with reference to the accompanying drawings.

It should be noted that the scope of the invention is not limited to the embodiments hereinafter described, but can arbitrarily be modified within the technical idea or the technical concept of the invention. Further, in the drawings hereinafter explained, the actual structures and the structures of the drawings might be made different from each other in scale size, number, and so on in order for making each constituent easy to understand.

Polarization Element

A polarization element and a method of manufacturing the polarization element according to an embodiment of the invention will hereinafter be explained with reference to the accompanying drawings.

Figure 1A:
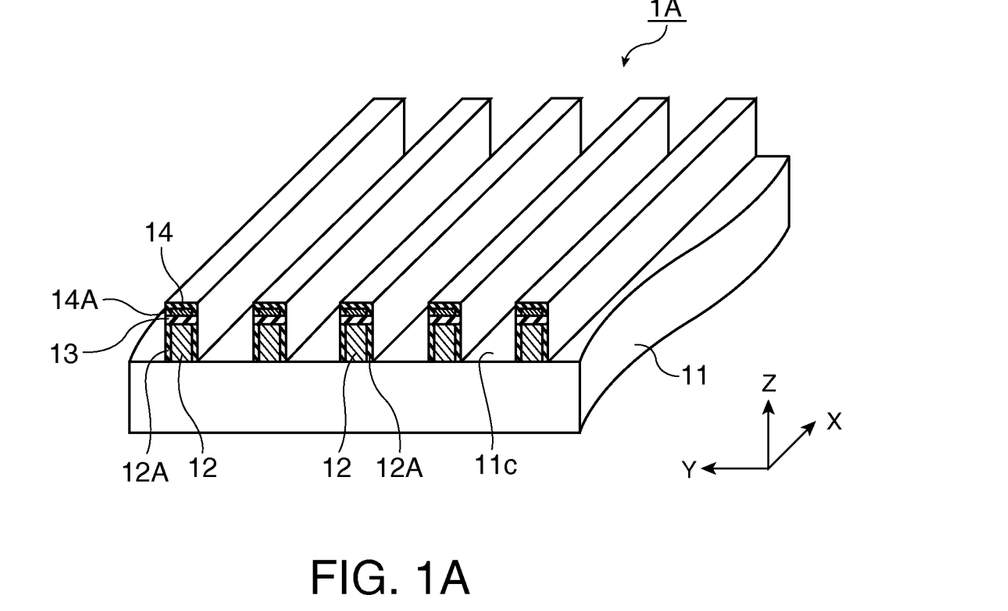
FIGS. 1A and 1B are schematic diagrams of a polarization element of an embodiment of the invention.
Figure 1B:
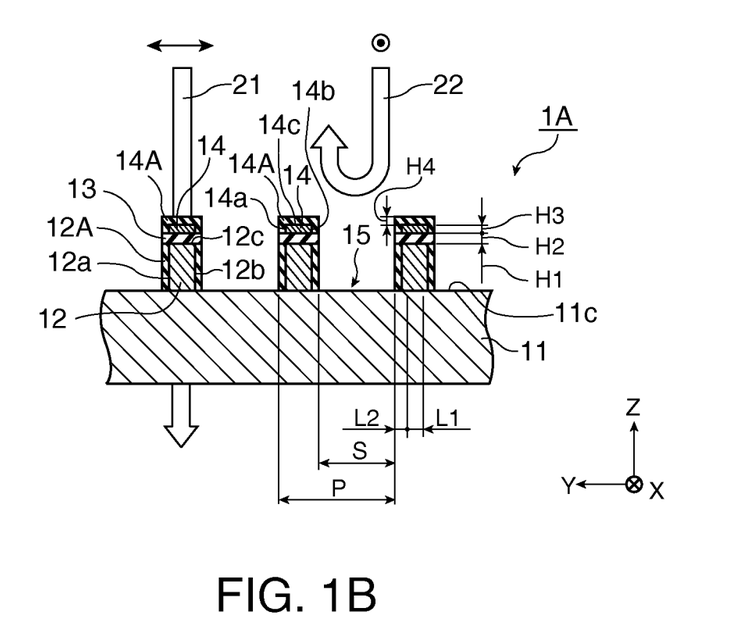

FIGS. 1A and 1B are schematic diagrams of the polarization element 1A according to the present embodiment, wherein FIG. 1A is a partial perspective view, and FIG. 1B is a partial cross-sectional view when cutting the polarization element 1A with a Y-Z plane.

It should be noted that in the following explanations, an XYZ Cartesian coordinate system is defined, and positional relationships between the respective members will be explained with reference to the XYZ Cartesian coordinate system. On this occasion, a plane parallel to a surface 11c of a substrate 11 provided with metal layers 12 is referred to as an X-Y plane, and an extending direction of the metal layers 12 is referred to as an X-axis direction. An arrangement direction (an arrangement axis) of the metal layers 12 is referred to as a Y-axis direction. Further, in all of the drawings described below, the ratios between the film thicknesses or the sizes of the constituents are made appropriately different from each other in order for making the drawings eye-friendly.

As shown in FIGS. 1A and 1B, the polarization element 1A is provided with a substrate 11, a plurality of metal layers 12 formed on the substrate 11 to form stripes in a plan view, first dielectric layers 12A formed on side surfaces of the respective metal layers 12, intermediate dielectric layers (third dielectric layers) 13 formed on the respective metal layers 12, absorber layers 14 formed on the respective intermediate dielectric layers 13, and second dielectric layers 14A formed on the surfaces of the respective absorber layers 14. In other words, the polarization element 1A has a structure having the metal layer 12, the intermediate dielectric layer 13, and the absorber layer 14 sequentially stacked on the substrate 11 in this order.

The first dielectric layers 12A cover the two side surfaces (a first side surface 12a and a second side surface 12b) of each of the metal layers 12 extending along the X-axis direction. The top surface (top section 12c) of each of the metal layers 12 is covered by the intermediate dielectric layer 13. The second dielectric layer 14A covers two side surfaces 14a, 14b and the top surface (top section 14c) of each of the absorber layers 14 extending in the X-axis direction formed on the respective intermediate dielectric layers 13.

The material of the substrate 11 is only required to be a material having a light transmitting property, and quartz, plastic, or the like can also be used therefor. In the present embodiment, a glass substrate is used as the substrate 11. Since the polarization element 1A might store heat to thereby be heated to high temperature depending on the usage of the polarization element 1A, it is preferable to use glass or quartz having high heat resistance as the material of the substrate 11.

The metal layers 12 are metal thin wires extending in one direction on the substrate 11, and are arranged in parallel to each other at a predetermined pitch on the substrate 11. As the material of the metal layers 12, there is used a material having a high light reflectance in the visible range. Specifically, aluminum, silver, copper, chromium, titanium, nickel, tungsten, iron, and so on can be used as the material of the metal layers 12. In the present embodiment, aluminum is used as the material of the metal layers 12.

The first dielectric layers 12A are formed so as to cover the side surfaces of each of the metal layers 12. As the material of the first dielectric layers 12A, an oxide of the metal constituting the metal layers 12 is used, and the material having a high light transmittance in the visible range, namely a dielectric material such as aluminum oxide, is used preferably. As described later, the first dielectric layers 12A can be formed using, for example, a method of oxidizing the metal layers 12 or a method of depositing an oxide of the metal constituting the metal layers 12.

It should be noted that it is sufficient for the first dielectric layers 12A to cover the metal layers 12 in the areas irradiated with the light in the polarization element 1A, and it is not necessarily required to cover the metal layers 12 in the other areas. If, for example, the plurality of metal layers 12 and the first dielectric layers 12A for covering the side surfaces thereof are formed on a large-sized substrate, and then the large-sized substrate is cut into the individual substrates 11, the metal layers 12 and the first dielectric layers 12A are cut at the edges of the substrate 11 to thereby become the condition in which the cut surfaces thereof are exposed. Such a configuration can also be adopted.

The intermediate dielectric layers 13 are formed to cover the top sections 12c of the respective metal layers 12. The intermediate dielectric layer 13 is formed as a barrier layer for preventing the mutual diffusion of the constituent elements between the metal layer 12 and the absorber layer 14, and is formed between the metal layer 12 and the absorber layer 14 if necessary.

The material of each of the intermediate dielectric layers 13 is not particularly limited providing the material is the dielectric material having the barrier property described above, and can be made of an oxide, a nitride, or an oxynitride of, for example, silicon, aluminum, chromium, titanium, nickel, and tungsten. In the case of the present embodiment, silicon oxide is used as the material of the intermediate dielectric layers 13.

The absorber layers 14 are formed on the respective intermediate dielectric layers 13 stacked on the respective metal layers 12, and extend along the extending direction (the X-axis direction) of the metal layers 12. As the material of the absorber layers 14, there is used a material having a light absorptance higher than the light absorptance of the intermediate dielectric layers 13 in the visible range. Specifically, the material is made of one material, or two or more materials selected from the group consisting of silicon, germanium, and chromium. In the present embodiment, silicon is used as the material of the absorber layers 14.

As shown in FIG. 1B, the second dielectric layers 14A are each formed so as to cover the two side surfaces 14a, 14b and the top surface (the top section 14c) of each of the absorber layers 14. As the material of the second dielectric layers 14A, there is used an oxide of the material constituting the absorber layers 14. Specifically, the second dielectric layers 14A is made of silicon oxide, germanium oxide, chromium oxide, or a material including two or more of these oxides. In the present embodiment, since the absorber layers 14 are made of silicon, the second dielectric layers 14A are made of silicon oxide.

Between the two metal layers 12 disposed adjacent to each other, there is provided a groove section 15. The groove sections 15 are disposed at a pitch shorter than the wavelength of visible light in the Y-axis direction with roughly equal intervals. Therefore, the metal layers 12 each having the first dielectric layers 12A formed on the side surfaces are also arranged in the Y-axis direction at a pitch shorter than the wavelength of visible light.

The dimensions of the respective sections in the polarization element 1A according to the present embodiment can be set as described below, for example.

The height H1 of the metal layers 12 is in a range of no smaller than 30 nm and no larger than 200 nm, and the width L1 (the line width) of each of the metal layers 12 in the Y-axis direction is in a range of no smaller than 20 nm and no larger than 60 nm.

The width L2 in the Y-axis direction (the thickness thereof in the side surface of the metal layer 12) of each of the first dielectric layers 12A formed on the surfaces of the respective metal layers 12 is in a range of no smaller than 5 nm and no larger than 30 nm. The height H2 (the thickness thereof in the top surface of each of the metal layers 12) of the intermediate dielectric layer 13 on each of the metal layers 12 is in a range of no smaller than 10 nm and no larger than 100 nm. The width of each of the intermediate dielectric layers 13 is in a range of no smaller than 30 nm and no larger than 120 nm.

Further, the height H3 (the thickness thereof on the intermediate dielectric layer 13) of each of the absorber layers 14 is in a range of no smaller than 5 nm and no larger than 30 nm, and the width thereof is in a range of no smaller than 20 nm and no larger than 60 nm. Both of the height H4 (the thickness thereof in the top surface of the absorber layer 14) of each of the second dielectric layers 14A formed on the surfaces of the respective absorber layers 14, and the width (the thickness thereof on the side surfaces of the absorber layer 14) thereof in the Y-axis direction are in a range of no smaller than 5 nm and no larger than 30 nm.

Further, the interval S (the width of the groove section 15 in the Y-axis direction) between the two first dielectric layers 12A disposed adjacent to each other is, for example, 70 nm, and the pitch P thereof is, for example, 140 nm.

In the polarization element 1A according to the present embodiment described hereinabove, the metal layers 12 are formed using the material having a high light reflectance in the visible range such as aluminum. The absorber layers 14 are formed using the material (such as silicon or germanium) having a light absorptance higher than the light absorptance of the first dielectric layers 12A in the visible range.

Further, the metal layers 12 are covered in the surface by the first dielectric layers 12A made of a material having a high light transmittance in the visible range such as an aluminum oxide, and the absorber layers 14 are covered in the surface by the second dielectric layer 14A made of a material such as silicon oxide or germanium oxide.

According to the polarization element 1A of the present embodiment provided with such a configuration, the following functions and advantages can be obtained.

Firstly, since the laminate structure of the metal layer 12, the intermediate dielectric layer 13, and the absorber layer 14 is adopted, it is possible to transmit a TM wave 21, which is a linearly polarized light vibrating in a direction perpendicular to the extending direction of the metal layers, while absorbing a TE wave 22, which is a linearly polarized light vibrating in the extending direction of the metal layers.

More specifically, the TE wave 22 entering the absorber layer 14 side of the substrate 11 is attenuated mainly by the light absorption function of the absorber layers 14, or attenuated by the second dielectric layers 14A depending on circumstances. A part of the TE wave 22 enters the intermediate dielectric layers 13 without being absorbed by the absorber layers 14 and the second dielectric layers 14A, but is provided with a phase difference when passing through the intermediate dielectric layers 13. The TE wave 22 passing through the intermediate dielectric layers 13 is reflected by the metal layers 12 (functioning as a wire grid). The TE wave 22 thus reflected is provided with the phase difference when passing through the intermediate dielectric layers 13, and is attenuated due to the interference effect, and the rest thereof is absorbed again by the absorber layers 14. Due to the attenuation effect to the TE wave 22 described above, the desired absorptive polarization spirit characteristics can be obtained.

Further, in the present embodiment, the both side surfaces of each of the metal layers 12 are covered by the first dielectric layers 12A made of the oxide of the metal constituting the metal layers 12. Since such first dielectric layers 12A can be formed easily by oxidizing the surfaces of the metal layers 12, and further, can be made as dense oxide films, it is possible to prevent the metal films 12 from being deteriorated due to the temperature rise during use, and thus the degradation in the polarization split function can be prevented.

Further, in the present embodiment, the absorber layers 14 are also covered by the second dielectric layers 14A made of the oxide of the material constituting the absorber layers 14. Thus, since the oxidation of the absorber layers never progresses even when the temperature of the polarization element 1A rises during use, alteration due to the temperature variation is hard to occur, and thus the variation in the polarization split function can be prevented.

Further, in the polarization element 1A according to the present embodiment, the intermediate dielectric layer 13 intervenes between the absorber layer 14 made of metal oxide and the metal layer 12. By adopting such a configuration, it is possible to prevent the mutual diffusion of the constituent elements between the absorber layer 14 and the metal layer 12. Thus, the variation in the polarization split function due to the alteration of the metal layers 12 or the absorber layers 14 can be prevented.

As described above, according to the present embodiment, there can be obtained the polarization element 1A having the polarization characteristics hard to be degraded even when the temperature rises during use.

Method of Manufacturing Polarization Element

Figure 2A:
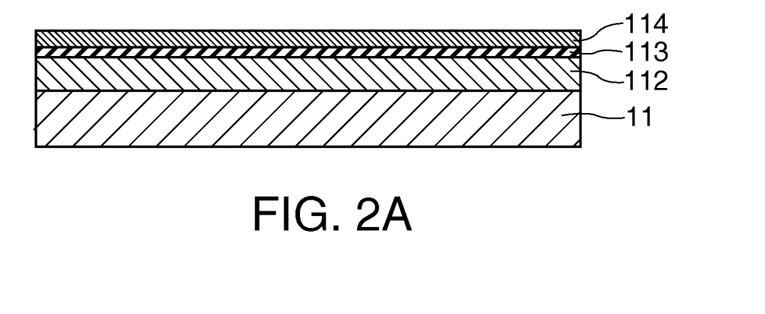
FIGS. 2A through 2C are process charts showing a method of manufacturing the polarization element according to the embodiment.
Figure 2B:
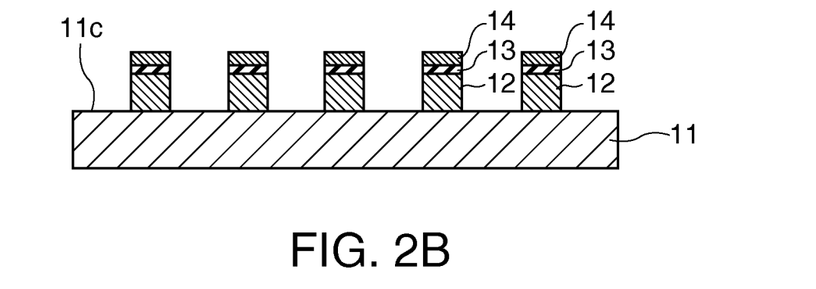
Figure 2C:
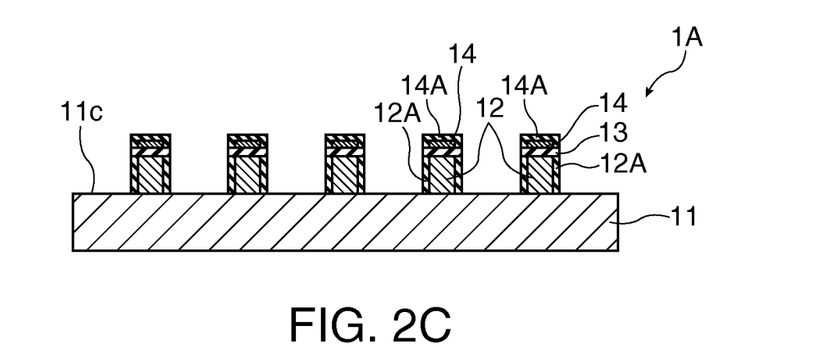

Then, a method of manufacturing the polarization element 1A according to the present embodiment will hereinafter be explained. FIGS. 2A through 2C are process charts showing the method of manufacturing the polarization element according to the present embodiment.

The method of manufacturing the polarization element according to the present embodiment is a manufacturing method in which the metal layer 12, the intermediate dielectric layer 13, and the absorber layer 14 stacked one another in the thickness direction of the substrate 11 so as to form a stripe in a plan view are formed on one surface of the substrate 11, then the surfaces of the metal layer 12 and the absorber layer 14 are oxidized in the atmosphere including oxygen to thereby form the first dielectric layer 12A on the surface of the metal layer 12 and at the same time form the second dielectric layer 14A on the surface of the absorber layer 14.

Hereinafter, the explanation will be presented with reference to the accompanying drawings.

Firstly, as shown in FIG. 2A, an aluminum film 112 as a metal film for forming the metal layers 12, a silicon oxide film 113 as a dielectric film for forming the intermediate dielectric layers 13, and a silicon film 114 as an inorganic film for forming the absorber layers 14 are formed on the substrate 11 in a stacked manner in this order. As the forming process of the thin films of the respective layers, a known deposition process such as a sputtering process or a CVD process can be used.

Subsequently, a resist film not shown is formed on the silicon film 114 as the uppermost layer, then the resist film is exposed and then developed to thereby be patterned into stripes. Subsequently, by etching the aluminum film 112, the silicon oxide film 113, and the silicon film 114 using the resist film thus patterned as the mask, the laminate body including the metal layer 12, the intermediate dielectric layer 13, and the absorber layer 14 forming a stripe in a plan view shown in FIG. 2B is formed.

In the etching process described above, the silicon film 114 and the silicon oxide film 113 can be etched by a dry etching process using a fluorine-based etching gas (such as $CF_4$, $CHF_3$, $CH_2F_2$, or $C_4F_8$). On the other hand, the aluminum film 112 can be etched by a dry etching process using a chlorine-based etching gas (such as $Cl_2$ or $BCl_3$).

After the laminate body described above is formed, then the first dielectric layer 12A is formed by oxidizing the surface of the metal layer 12, and at the same time, the second dielectric layer 14A is formed by oxidizing the surface of the absorber layer 14 as shown in FIG. 2C.

Specifically, the substrate 11 provided with the laminate bodies each including the metal layer 12, the intermediate dielectric layer 13, and the absorber layer 14 is disposed in a vacuum chamber made of quartz or the like containing an ozone gas controlled in a range of 50 Pa through 100 Pa. Subsequently, the surface 11c of the substrate 11 is irradiated with ultraviolet light (with the wavelength shorter than 310 nm) using a deep-UV lamp or the like. The ultraviolet light intensity on this occasion is, for example, 120 mW/cm$^2$. Since the ozone gas has a high absorption coefficient in a wavelength range of 220 nm through 300 nm, as a result of the light absorption reaction, oxygen atoms in an excited state having high energy can efficiently be generated.

The excited oxygen atoms described above have a larger diffusion coefficient (an activation level), and express higher oxidation rate compared to a normal oxygen atom. Further, the oxide film can be generated at lower temperature compared to the thermal oxidation. Further, in the present process, the substrate 11 can be heated so that the oxidation reaction of the surface of the metal layer 12 and the surface of the absorber layer 14 can be accelerated by heating to thereby form the first dielectric layers 12A and the second dielectric layers 14A in a shorter time. As the process of heating the substrate 11, there can be cited, for example, a process of irradiating the back side (the surface opposite to the surface 11c) of the substrate 11 with the light emitted from a halogen lamp. The heating temperature of the substrate 11 is, for example, 150° C.

By performing the ozone oxidation for 20 minutes in the condition of heating the substrate 11 at 150° C., the aluminum oxide film (the first dielectric layer 12A) with the thickness of 20 nm can be formed on the surface of each of the metal layers 12, and the silicon oxide film (the second dielectric layer 14A) with the thickness of 10 nm can be formed on the surface of each of the absorber layers 14. By controlling the process conditions (the substrate temperature and the process time) of the present process, the thicknesses of the first dielectric layer 12A and the second dielectric layer 14A can be controlled with freedom. In other words, the widths of the metal layer 12 and the absorber layer 14 remaining unoxidized can also be controlled with freedom.

In the manufacturing method according to the present embodiment explained hereinabove, at first, the metal layer 12, the intermediate dielectric layer 13, and the absorber layer 14 are formed in a stacked manner, and then the first dielectric layer 12A and the second dielectric layer 14A are formed by oxidizing the metal layer 12 and the absorber layer 14 in a lump. Thus, since the structure having the metal layer 12 and the absorber layer 14 covered by dielectric layers can easily be formed, the polarization element having the polarization split characteristics hard to be varied due to the temperature rise during use, and superior in high-temperature reliability can easily be manufactured.

Further, since the ozone oxidation is used as the process of oxidizing the surfaces of the metal layers 12 and the absorber layers 14, the oxide films (the first dielectric layers 12A and the second dielectric layers 14A) of the metal layers 12 and the absorber layers 14 can be formed using the process at lower temperature compared to the related art. Thus, the breakage or the deformation of the substrate 11 in the manufacturing process can be reduced. Further, since the deformation of the substrate can be reduced, it is possible to prevent the dimensions such as the height and the width of the metal layer 12 and the absorber layer 14 determining the characteristics of the polarization element from changing between before and after the heat treatment. As a result, the polarization element superior in the in-plane uniformity of the polarization split characteristics can be manufactured.

MODIFIED EXAMPLES

Then, some modified examples of the polarization element according to the present embodiment will be explained with reference to FIGS. 3A through 3C.

Figure 3A:
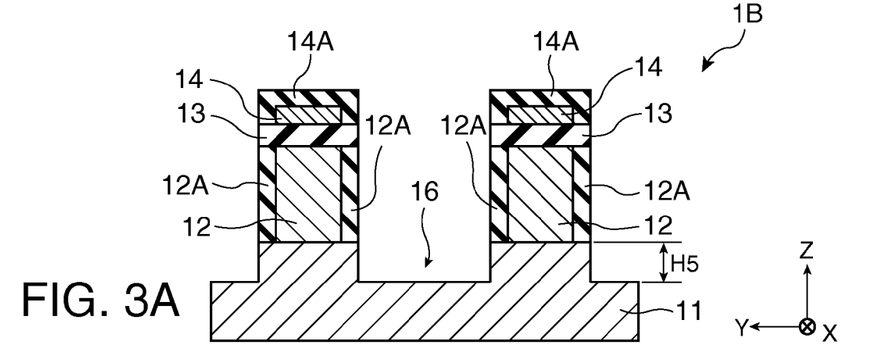
FIGS. 3A through 3C are partial cross-sectional views of the polarization elements according to first through third modified examples.
Figure 3B:
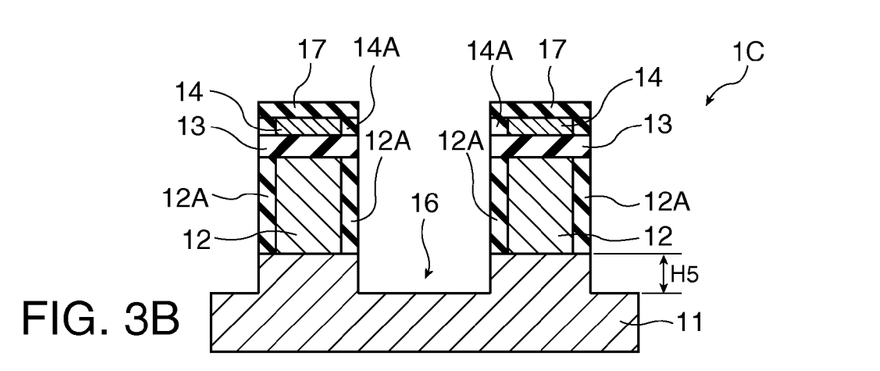
Figure 3C:
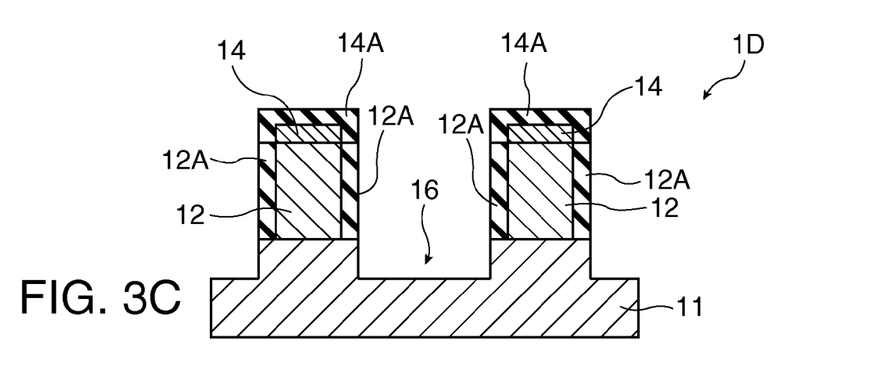

FIGS. 3A through 3C are partial cross-sectional views of the polarization elements according to first through third modified examples.

First Modified Example

The polarization element 1B of the first modified example shown in FIG. 3A has an area 16 with a refractive index lower than that of the substrate 11 disposed in an area between the metal layers 12 adjacent to each other. The configuration other than the areas 16 is common to the polarization element 1B and the polarization element 1A shown in FIGS. 1A and 1B.

In the present modified example, the areas 16 are formed by partially removing the surface of the substrate 11 exposed between the metal layers 12 disposed on the substrate 11 adjacent to each other by the dry etching or the like. Alternatively, it is also possible to use the substrate 11 with grooves having been formed previously as stripes. The depth H5 with which the surface of the substrate 11 is entrenched is in a range of no smaller than 30 nm and no larger than 200 nm, for example.

According to the polarization element 1B provided with the configuration described above, since the effective refractive index in the vicinity of the interface between the substrate 11 and the metal layers 12 can be reduced, the reflection of the TM wave 21 (the polarized light transmitted through the polarization element) on the interface can be reduced, and thus the high-transmittance polarization element can be obtained.

Second Modified Example

Then, the polarization element 1C of the second modified example shown in FIG. 3B is provided with a configuration in which the laminate bodies each including the metal layer 12 having the first dielectric layers 12A formed on the side surfaces, the intermediate dielectric layer 13 (the third dielectric layer), and the absorber layer 14 having the second dielectric layers 14A formed on the side surfaces are formed on the substrate 11, and fourth dielectric layers 17 are further formed on the respective laminate bodies.

It should be noted that although the areas 16 with the low refractive index are formed between the metal layers 12 adjacent to each other in FIG. 3B, the configuration having the groove sections 15 shown in FIGS. 1A and 1B can also be adopted.

The fourth dielectric layers 17 can be formed using an arbitrary dielectric material. Specifically, an oxide, a nitride, and an oxynitride of, for example, silicon, aluminum, chromium, titanium, nickel, tungsten, and manganese can be cited as examples. In the case of the present embodiment, silicon oxide is used as the material of the fourth dielectric layers 17.

In the case of the present embodiment, since the fourth dielectric layer 17 is formed as the upper layer of the absorber layer 14, it is preferable to form the fourth dielectric layers 17 using a dielectric material having a light absorptance higher than that of the first dielectric layers 12A. By using, for example, the chromium oxide or the manganese oxide, the fourth dielectric layers 17 themselves exert the light absorption property, and therefore, the absorptance of the TE wave 22 can be improved.

It should be noted that in the present embodiment, the stacking order of the metal layer 12 and the absorber layer 14 can be exchanged. Specifically, the configuration in which the absorber layer 14, the intermediate layer 13, the metal layer 12, and the fourth dielectric layer 17 are sequentially stacked on the substrate 11 in this order can also be adopted. In this case, it is preferable to form the fourth dielectric layers 17 using the dielectric material (such as silicon oxide or aluminum oxide) superior in light transmittance.

The polarization element 1C can be manufactured by a manufacturing method substantially the same as that of the polarization element 1A according to the embodiment described above. Specifically, the polarization element 1C can be manufactured by the manufacturing method including a deposition process of depositing a metal film (an aluminum film) for forming the metal layers 12, a dielectric film (a silicon oxide film) forming the intermediate dielectric layers 13, an inorganic film (a silicon film) for forming the absorber layers 14, and a dielectric film (a silicon oxide film) for forming the fourth dielectric layers 17 on the substrate 11 using a sputtering process or the like, a patterning process of patterning the laminate film described above into stripes in a plan view to thereby form the laminate bodies each including the metal layer 12, the intermediate dielectric layer 13, the absorber layer 14, and the fourth dielectric layer 17, and an oxidation process of disposing the substrate provided with the laminate bodies in the atmosphere including oxygen, and oxidizing the surface of the metal layer 12 and the absorber layer 14 to thereby form the first dielectric layer 12A on the side surface of the metal layer 12 and the second dielectric layer 14A on the side surface of the absorber layer 14.

Third Modified Example

Then, the polarization element 1D of the third modified example shown in FIG. 3C is provided with a configuration in which the laminate bodies each including the metal layer 12 having the first dielectric layers 12A formed on the side surfaces, and the absorber layer 14 having the second dielectric layers 14A formed on the side surfaces and on the top surface are formed on the substrate 11. In other words, the polarization element 1D of the third modified example is obtained by eliminating the intermediate dielectric layers 13 in the polarization element 1A shown in FIGS. 1A and 1B.

It should be noted that in the polarization element 1D, the light, which enters the metal layer 12 from the absorber layer 14 and is reflected by the metal layer 12, is absorbed by the absorber layer 14 and the second dielectric layer 14A when transmitted again through the absorber layer 14 and the second dielectric layer 14A. Therefore, the polarization element 1D of the present modified example also acts as the absorptive polarization element.

Further, since the metal layers 12 and the absorber layers 14 are also covered by the first dielectric layers 12A or the second dielectric layers 14A in the polarization element 1D, the metal layers 12 and the absorber layers 14 can be prevented from being oxidized even if the temperature rises during use. Thus, the variation in the polarization split characteristics due to the temperature rise can be reduced, and thus, the superior high-temperature reliability can be obtained.

Projection Display Device

Figure 4:
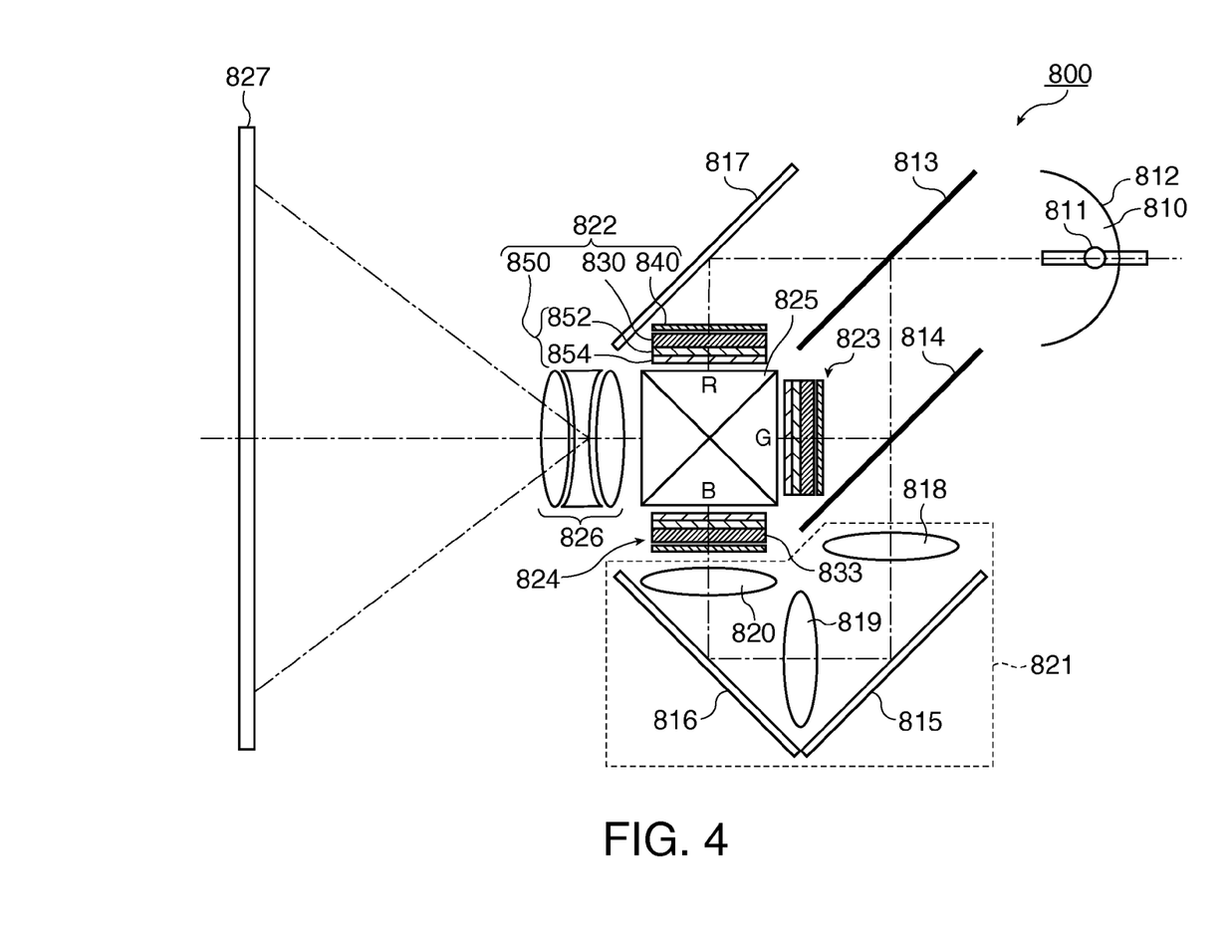
FIG. 4 is a diagram showing a projector as an embodiment of the invention.

FIG. 4 is a diagram showing a projector as an embodiment.

The projector 800 shown in FIG. 4 has a light source 810, dichroic mirrors 813, 814, reflecting mirrors 815, 816, and 817, an entrance lens 818, a relay lens 819, an exit lens 820, light modulation sections 822, 823, and 824, a cross dichroic prism 825, and a projection lens 826.

The light source 810 includes a lamp 811 such as a metal halide lamp, and a reflector 812 for reflecting the light of the lamp. It should be noted that as the light source 810, a super-high pressure mercury lamp, a flash mercury lamp, a high-pressure mercury lamp, a deep-UV lamp, a xenon lamp, a xenon flash lamp, and so on can also be used besides the metal halide lamp.

The dichroic mirror 813 transmits red light included in white light emitted from the light source 810, and reflects blue light and green light. The red light thus transmitted is reflected by the reflecting mirror 817, and input to the light modulation section 822 for the red light. Further, the green light out of the blue light and the green light both reflected by the dichroic mirror 813 is reflected by the dichroic mirror 814, and is then input to the light modulation section 823 for the green light. The blue light is transmitted through the dichroic mirror 814, and is then input to the light modulation section 824 for the blue light via the relay optical system 821 provided for preventing the light loss due to a long light path, and including the entrance lens 818, the relay lens 819, and the exit lens 820.

The light modulation sections 822 through 824 each have an entrance side polarization element 840 and an exit side polarization element section 850 disposed on the both sides of a liquid crystal light valve 830 so as to sandwich the liquid crystal light valve 830. The entrance side polarization element 840 is disposed on the light path of the light emitted from the light source 810 and between the light source 810 and the liquid crystal light valve 830. Further, the exit side polarization element 850 is disposed on the light path of the light transmitted through the liquid crystal light valve 830 and between the liquid crystal light valve 830 and the projection lens 826. The entrance side polarization element 840 and the exit side polarization element section 850 are arranged so as to have the respective transmission axes perpendicular to each other (the cross-Nicol arrangement).

The entrance side polarization element 840 is a reflective polarization element, and reflects the light having the oscillation direction perpendicular to the transmission axis.

On the other hand, the exit side polarization element section 850 has a first polarization element (a pre-polarization plate, synonymous with a pre-polarizer) 852, and a second polarization element 854. As the first polarization element 852, there is used the polarization element according to the present embodiment described above. Further, the second polarization element 854 is a polarization element having an organic material as the constituent material. Both of the first polarization element 852 and the second polarization element 854 are the absorptive polarization elements, and the first polarization element 852 and the second polarization element 854 absorb the light in cooperation with each other. It should be noted that it is also possible to use the polarization element according to the embodiment described above as the entrance side polarization element 840.

In general, the absorptive polarization element made of an organic material is easily deteriorated by heat, and is therefore hard to be used as a polarization section of a high-power projector requiring high luminance. However, in the projector 800 according to the present embodiment, the first polarization element 852 made of an inorganic material having high heat resistance is disposed between the second polarization element 854 and the liquid crystal light valve 830, and the first polarization element 852 and the second polarization element 854 absorb the light in cooperation with each other. Therefore, the deterioration of the second polarization element 854 made of an organic material can be prevented.

The three colored lights modulated by the respective light modulation sections 822 through 824 enter the cross dichroic prism 825. The cross dichroic prism 825 is composed of four rectangular prisms bonded to each other, and on the interface therebetween, there are formed a dielectric multilayer film for reflecting the red light and a dielectric multilayer film for reflecting the blue light so as to have an X shape. The three colored lights are combined by these dielectric multilayer films to thereby form the light representing a color image. The light obtained by combining the three colored lights is projected on a screen 827 by the projection lens 826 as a projection optical system, and thus, the image is displayed in an enlarged manner.

Since the projector 800 having such a configuration as described above is arranged to use the polarization element according to the embodiment described above as the exit side polarization element section 850, the deterioration of the polarization element can be prevented even if the high power light source is used. Therefore, the projector 800 can be made to have high reliability and superior display characteristics.

Liquid Crystal Device

Figure 5:
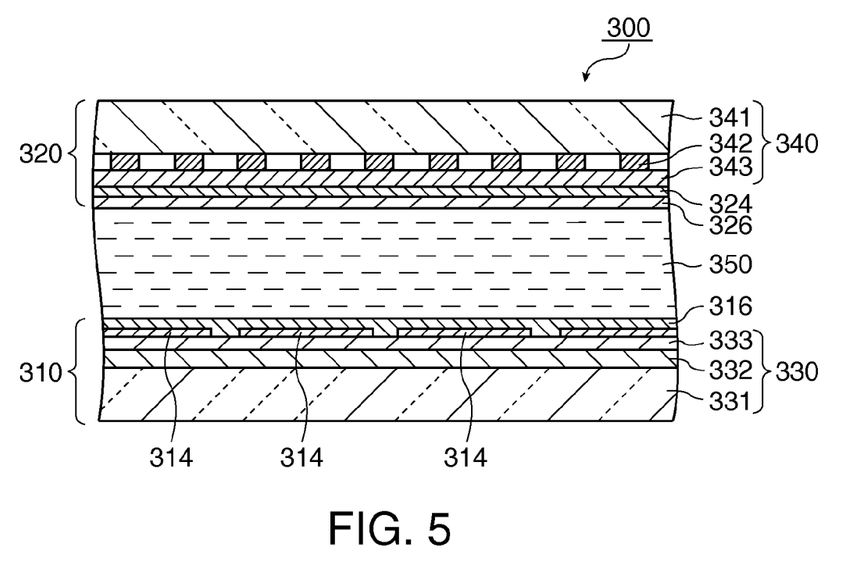
FIG. 5 is a schematic cross-sectional view showing a liquid crystal device as an embodiment of the invention.

FIG. 5 is a schematic cross-sectional view showing an example of a liquid crystal device 300 equipped with the polarization element according to the embodiment of the invention. The liquid crystal device 300 according to the present embodiment is configured to have a liquid crystal layer 350 sandwiched between an element substrate 310 and an opposed substrate 320.

The element substrate 310 is provided with a polarization element 330, and the opposed substrate 320 is provided with a polarization element 340. The polarization element 330 and the polarization element 340 are each the polarization element according to the embodiment described above.

The polarization element 330 is provided with a substrate main body 331, a grid section 332, and a protective film 333, and the polarization element 340 is provided with a substrate main body 341, a grid section 342, and a protective film 343, respectively. The substrate main bodies 331, 341 each correspond to the substrate 11 in the embodiment described above. The grid sections 332, 342 each correspond to the convex stripes each including the metal layer 12, the intermediate dielectric layer 13, the absorber layer 14, the first dielectric layers 12A, and the second dielectric layers 14A in the embodiment described above.

Regarding the grid sections 332, 342, the metal layers 12, the intermediate dielectric layers 13, the absorber layers 14, and so on provided to each of the grid sections are not shown in the drawing. In the present embodiment, the substrate main bodies 331, 341 are substrates of the polarization elements, and at the same time, the substrates of the liquid crystal device. Further, the grid section 332 and the grid section 342 are disposed so as to cross each other.

On the liquid crystal layer 350 side of the polarization element 330, there are disposed pixel electrodes 314, wiring not shown, and TFT elements, and further, an oriented film 316 is also disposed. Similarly, on the inner surface side of the polarization element 340, there are disposed a common electrode 324 and an oriented film 326.

In the liquid crystal device having such a configuration, since the substrate main bodies 331, 341 have both of the functions of the substrate for the liquid crystal device and the substrate for the polarization element, the number of components can be reduced. Therefore, the entire device can be made thinner, and the function of the liquid crystal device 300 can be improved. Further, since the device structure can be simplified, manufacturing becomes easier, and at the same time, the cost reduction can be achieved.

Electronic Apparatus

Figure 6:
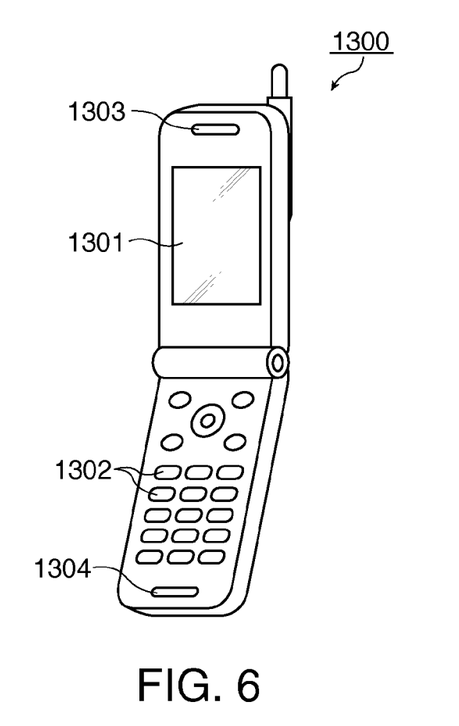
FIG. 6 is a perspective view showing an example of an electronic apparatus using the liquid crystal device shown in FIG. 5.

Then, an electronic apparatus according to another embodiment of the invention will be explained. FIG. 6 is a perspective view showing an example of the electronic apparatus using the liquid crystal device shown in FIG. 5. A cellular phone (an electronic apparatus) 1300 shown in FIG. 6 is configured including the liquid crystal device according to the embodiment of the invention as a small-sized display section 1301, a plurality of operation buttons 1302, an ear piece 1303, and a mouthpiece 1304. Thus, the cellular phone 1300 equipped with the display section superior in reliability and capable of high-quality display can be provided.

Further, the liquid crystal device according to the embodiment of the invention can preferably be used as an image display section of an electronic book, a personal computer, a digital still camera, a liquid crystal television, a projector, a video cassette recorder of either a view-finder type or a direct view type, a car navigation system, a pager, a personal digital assistance, an electronic calculator, a word processor, a workstation, a picture phone, a POS terminal, a device equipped with a touch panel, and so on, besides the cellular phone described above.

It should be noted that the present invention is not limited to the embodiments described above, but can be modified in various manners in practical use within a scope or spirit of the invention.

Optical Characteristic Evaluation by Simulation Analysis

Then, a result of the simulation analysis of the polarization element according to the embodiment will be explained.

In the analysis, the evaluation is performed assuming that the polarization element according to the embodiment of the invention is applied as the polarization element for the light valve of the liquid crystal projector. Since the polarization element according to the embodiment of the invention is made of an inorganic material and therefore has high heat resistance, the polarization element according to the embodiment can be applied as the pre-polarization plate of the liquid crystal projector having a high-power light source described above.

Such a pre-polarization plate is required to have high transmittance with respect to the TM light, and to preferably transmit the TM light. On the other hand, since the two polarization elements absorb the TE light in cooperation with each other as described above, very high absorptance of the TE light is not required. Specifically, there is no problem for use providing the transmittance of the TM light is higher than 80%, and the absorptance of the TE light is higher than 40%. In order for reducing the load on the second polarization element, it is more preferable that the absorptance of the TE light is higher than 50%. Further, in order for preventing the TE light from being reflected by the pre-polarization plate and returning to the light valve, the lower reflectance of the TE light is more preferable, and the reflectance lower than 20% is desirable.

Therefore, in the analysis described below, the evaluation is performed taking the TM light transmittance higher than 80%, the TE light reflectance lower than 20%, and the TM light reflectance lower than 20% as the criteria.

In the simulation analysis, GSolver, which is analysis software developed by Grating Solver Development Company, is used, and the shape of the polarization element, the refractive index of the constituent material, and so on are used as the parameters.

The numerical calculation is performed using the model (the polarization element 1B of the first modified example) in which the metal layer 12 (aluminum), the intermediate dielectric layer 13 (silicon oxide), the absorber layer 14 are stacked sequentially on the substrate in this order, the first dielectric layers 12A (aluminum oxide) are formed on the surfaces of the metal layer 12, the second dielectric layers 14A (silicon oxide) are formed on the surfaces of the absorber layer 14, and the surface of the substrate 11 is entrenched in the area between the metal layers 12 adjacent to each other.

In the calculation, it is assumed that the height H1 of the metal layer 12 (aluminum) is 60 nm, the width L1 thereof is 20 nm, the width (the thickness) L2 of the first dielectric layer 12A (aluminum oxide) is 20 nm, the height H2 of the intermediate dielectric layer 13 (silicon oxide) is 10 nm, the height H3 of the absorber layer 14 (silicon) is 10 nm, the height H4 and the width of the second dielectric layer 14A (silicon oxide) are 10 nm, the width W of the area 16 in the Y-axis direction is 80 nm, the digging depth H5 of the substrate 11 in the area 16 is 30 nm, and the pitch P of the metal layers is 140 nm. Further, as the refractive index and the extinction coefficient of the constituent material of the polarization element described above, the respective parameters stored in the GSolver are used.

Figure 7:
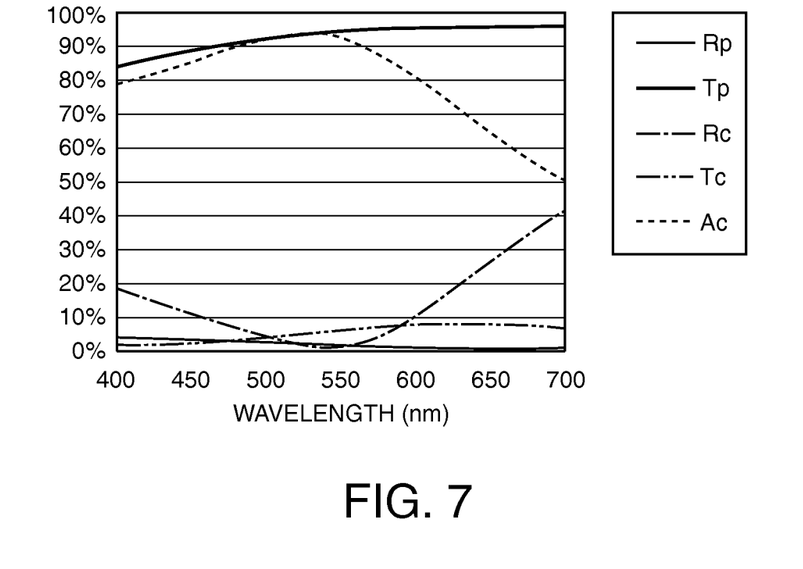
FIG. 7 is a graph showing a simulation result of the polarization split characteristics.

In the model described above, the polarization characteristics in the wavelength band of 400 nm through 700 nm are obtained. FIG. 7 is a graph showing the simulation result of the polarization split characteristics with respect to the TM light and the TE light. In the graph, Rp represents the reflectance (%) of the TM light, Tp represents the transmittance (%) of the TM light, Rc represents the reflectance (%) of the TE light, Tc represents the transmittance (%) of the TE light, and Ac represents the light absorptance ($100-Rp-Rc$ (%)) of the polarization element.

As shown in FIG. 7, the polarization element provided with the configuration of the embodiment of the invention fulfills the conditions of the TM light transmittance higher than 80%, the TE light reflectance lower than 20%, and the TM light reflectance lower than 20% in the wavelength band of 400 nm through 650 nm, and is therefore recognized to have the preferable characteristics as the pre-polarization plate.

The entire disclosure of Japanese Patent Application No. 2010-245493, filed on Nov. 1, 2010 is expressly incorporated by reference herein.

What is claimed is:

1. A polarization element comprising:
   a substrate;
   a metal layer and an absorber layer formed on the substrate to form a stripe in a plan view and stacked in a thickness direction of the substrate;
   a first dielectric layer formed on a surface of the metal layer, and made of an oxide of a metal constituting the metal layer; and
   a second dielectric layer formed on a surface of the absorber layer, and made of an oxide of a material constituting the absorber layer.

2. The polarization element according to claim 1, further comprising:
   a third dielectric layer formed between the metal layer and the absorber layer.

3. The polarization element according to claim 2, further comprising:
   a fourth dielectric layer formed as an upper layer of a laminate body, the laminate body including the metal layer and the absorber layer.

4. The polarization element according to claim 1, wherein the absorber layer is made of at least one material selected from the group consisting of silicon, germanium, and chromium.

5. The polarization element according to claim 1, wherein the metal layer is made of at least one metal selected from the group consisting of aluminum, silver, copper, chromium, titanium, nickel, tungsten, and iron.

6. A projector comprising:
   an illumination optical system adapted to emit a light;
   a liquid crystal light valve adapted to modulate the light; and
   a projection optical system adapted to project the light modulated by the liquid crystal light valve on a projection target surface,
   wherein the polarization element according to claim 1 is disposed at least one of between the liquid crystal light valve and the illumination optical system and between the liquid crystal light valve and the projection optical system.

7. A projector comprising:
   an illumination optical system adapted to emit a light;
   a liquid crystal light valve adapted to modulate the light; and
   a projection optical system adapted to project the light modulated by the liquid crystal light valve on a projection target surface,
   wherein the polarization element according to claim 2 is disposed at least one of between the liquid crystal light valve and the illumination optical system and between the liquid crystal light valve and the projection optical system.

8. A projector comprising:
   an illumination optical system adapted to emit a light;
   a liquid crystal light valve adapted to modulate the light; and
   a projection optical system adapted to project the light modulated by the liquid crystal light valve on a projection target surface,
   wherein the polarization element according to claim 3 is disposed at least one of between the liquid crystal light valve and the illumination optical system and between the liquid crystal light valve and the projection optical system.

9. A projector comprising:
   an illumination optical system adapted to emit a light;
   a liquid crystal light valve adapted to modulate the light; and
   a projection optical system adapted to project the light modulated by the liquid crystal light valve on a projection target surface,
   wherein the polarization element according to claim 4 is disposed at least one of between the liquid crystal light valve and the illumination optical system and between the liquid crystal light valve and the projection optical system.

10. A liquid crystal device comprising:
    a liquid crystal layer held between a pair of substrates; and
    the polarization element according to claim 1 formed on the liquid crystal layer side of at least one of the pair of substrates.

11. A liquid crystal device comprising:
    a liquid crystal layer held between a pair of substrates; and
    the polarization element according to claim 2 formed on the liquid crystal layer side of at least one of the pair of substrates.

12. A liquid crystal device comprising:
    a liquid crystal layer held between a pair of substrates; and
    the polarization element according to claim 3 formed on the liquid crystal layer side of at least one of the pair of substrates.

13. A liquid crystal device comprising:
    a liquid crystal layer held between a pair of substrates; and
    the polarization element according to claim 4 formed on the liquid crystal layer side of at least one of the pair of substrates.

14. An electronic apparatus comprising the liquid crystal device according to claim 10.

15. An electronic apparatus comprising the liquid crystal device according to claim 11.

16. An electronic apparatus comprising the liquid crystal device according to claim 12.

17. An electronic apparatus comprising the liquid crystal device according to claim 13.

* * * * *